United States Patent
Chen et al.

(10) Patent No.: US 9,501,994 B2
(45) Date of Patent: Nov. 22, 2016

(54) LIQUID CRYSTAL DISPLAY PANEL AND DRIVING METHOD THEREOF

(71) Applicant: SHENZHEN CHINA STAR OPTOELECTRONICS TECHNOLOGY CO., LTD., Shenzhen (CN)

(72) Inventors: Cheng Hung Chen, Shenzhen (CN); Jiali Jiang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,395

(22) PCT Filed: Dec. 30, 2014

(86) PCT No.: PCT/CN2014/095599
§ 371 (c)(1),
(2) Date: Jan. 22, 2015

(87) PCT Pub. No.: WO2016/090698
PCT Pub. Date: Jun. 16, 2016

(65) Prior Publication Data
US 2016/0171947 A1    Jun. 16, 2016

(30) Foreign Application Priority Data
Dec. 10, 2014  (CN) .......................... 2014 1 0752075

(51) Int. Cl.
G09G 5/00       (2006.01)
G09G 3/36       (2006.01)
G02F 1/1368     (2006.01)
G02F 1/1362     (2006.01)
G09G 3/20       (2006.01)

(52) U.S. Cl.
CPC .......... *G09G 3/3696* (2013.01); *G02F 1/1368* (2013.01); *G02F 1/136213* (2013.01); *G09G 3/3648* (2013.01); *G09G 3/3659* (2013.01); *G09G 3/2003* (2013.01); *G09G 3/3607* (2013.01); *G09G 3/3677* (2013.01); *G09G 2320/028* (2013.01); *G09G 2320/0666* (2013.01)

(58) Field of Classification Search
CPC ................ G09G 3/3696; G09G 3/3648; G09G 3/2003; G09G 2320/0626; G09G 2320/0666
USPC ........................... 345/87–100, 204–215, 690
See application file for complete search history.

(56) References Cited

U.S. PATENT DOCUMENTS

| | | | |
|---|---|---|---|
| 9,057,899 B2* | 6/2015 | Dong | G02F 1/13624 |
| 2015/0109282 A1* | 4/2015 | Chen | G09G 3/3677 |
| | | | 345/212 |
| 2015/0138471 A1* | 5/2015 | Dong | G02F 1/13306 |
| | | | 349/43 |

* cited by examiner

*Primary Examiner* — Vijay Shankar
(74) *Attorney, Agent, or Firm* — Buchanan Ingersoll & Rooney PC

(57) ABSTRACT

The present disclosure discloses a liquid crystal display panel and a driving method thereof. The liquid crystal display panel comprises a plurality of pixel units, each pixel unit comprising: a data line, a first scanning line, a second scanning line, a first switch, a second switch, and a pixel electrode. One pixel presenting different voltages during different time of one frame can be realized through the new liquid crystal display panel and the driving method proposed by the present disclosure. Moreover, the aperture ratio and the penetration of the LCD panel would not be reduced by the design of the pixel unit.

9 Claims, 3 Drawing Sheets

LIQUID CRYSTAL DISPLAY PANEL AND DRIVING METHOD THEREOF

CROSS REFERENCE TO RELATED APPLICATION

The present application claims benefit of Chinese patent application CN 201410752075.5, entitled "Liquid Crystal Display Panel and Driving Method Thereof" and filed on Dec. 10, 2014, which is incorporated herein by reference.

FIELD OF THE INVENTION

The present disclosure relates to a liquid crystal display device, and particularly to a liquid crystal display panel and a method for driving the liquid crystal display panel.

BACKGROUND OF THE INVENTION

The Vertical Alignment Liquid Crystal Display (VA-LCD) has been commonly used in the field of large sized Thin Film Transistor Liquid Crystal Display (TFT-LCD) by virtue of its advantages of wide viewing angle, high picture contrast, and without friction alignment being necessary. A variety of vertical alignment display technologies have been developed based on different structures and techniques thereof. As the common feature of vertical alignment display technologies, the Color Shift phenomenon under different viewing angles is an important issue in the design of vertical alignment products.

In order to solve the problem of color shift under wide viewing angles, a plurality of pixel structures are proposed by technicians in the art to reduce the color shift thereof. In the charge sharing method usually used to solve the color shift problem under wide viewing angles, the Indium Tin Oxide (ITO) region of the pixel unit is divided into several domains, and the brightness of different domains are configured to be different from one another through providing a plurality of Thin Film Transistors therein. By means of which, a low color shift display effect under wide viewing angles can be achieved.

FIG. 1 schematically shows an equivalent circuit of a pixel unit with three Thin Film Transistors (TFTs) in the prior art. The scanning line $G_n$, when outputs a high-level voltage, charges and discharges a liquid crystal capacitor $C_{lc-A}$, a storage capacitor $C_{st-A}$, charge sharing capacitors $C_{cs-A}$ and $C_{ls-B}$ in area A through TFT1, and charges and discharges a liquid crystal capacitor $C_{lc-B}$ and a storage capacitor $C_{st-B}$ in area B through TFT2, so that a pixel voltage $V_{pA}$ and a pixel voltage $V_{pB}$, which are basically equal to each other, are reached respectively. When the charging and discharging procedures come to an end, the TFT1 and TFT2 are turned off, the scanning line $G_{n+1}$ outputs a high-level voltage, and a TFT3 is turned on. The voltage formed on the node C through the capacitive coupling voltage diverting effect of the charge sharing capacitors $C_{cs-A}$ and $C_{cs-B}$ is the final pixel voltage $V_{pB}$ in area B. Because of the voltage difference between the pixel voltage $V_{pA}$ and the pixel voltage $V_{pB}$, the brightness of different domains can be different from one another, and thus a low color shift display effect under wide viewing angles can be achieved.

However, the aperture ratio of the LCD panel manufactured by the above method would decrease greatly compared with the LCD panel with normal pixel design. In this case, the penetration of the Cell, i.e., the liquid crystal screen equipped with Printed Circuit Board (PCB) and Chip On Film (COF), would decrease, and thus the cost of the backlight source would increase. Therefore, how to realize a low color shift display effect under wide viewing angles without the aperture ratio and the penetration thereof being reduced has become an effort demanding task in the industry.

SUMMARY OF THE INVENTION

One of the technical problems to be solved by the present disclosure is to provide a liquid crystal display panel, whereby a low color shift display effect under wide viewing angles can be realized without the aperture ratio and the penetration thereof being reduced. In addition, the present disclosure further provides a method for driving the liquid crystal display panel.

1. In order to solve the aforesaid technical problem, the present disclosure provides a liquid crystal display panel, comprising: a plurality of pixel units, each pixel unit comprising: a data line; a first scanning line; a second scanning line, adjacent to said first scanning line, and configured to transmit a preset scanning signal; a first switch, connected between said data line and a pixel electrode, and configured to be turned on when receives a scanning signal of said first scanning line; a second switch, connected between said pixel electrode and a common electrode, and configured to be critically turned on when receives the preset scanning signal of said second scanning line; a storage capacitor, connected between said pixel electrode and said common electrode; and a liquid crystal capacitor, one end of which is connected to said pixel electrode, wherein when the first switch is turned on, said pixel electrode receives a data signal from said data line to have an electric potential, and when the second switch is critically turned on, the electric potential of said pixel electrode decreases gradually through said second switch until the electric potential is equal to an electric potential of said common electrode.

2. In one preferred embodiment of item 1 of the present disclosure, said first switch and said second switch each comprise a gate, a first source/drain, and a second source/drain; the gate of said first switch is connected to said first scanning line, and the first source/drain and the second source/drain of said first switch are connected to said data line and said pixel electrode respectively; and the gate of said second switch is connected to said second scanning line, and the first source/drain and the second source/drain of said second switch are connected to said pixel electrode and said common electrode respectively.

3. In one preferred embodiment of item 1 or item 2 of the present disclosure, said preset scanning signal includes a group of signals which change with the data signal of said data line.

4. In one preferred embodiment of any one of item 1 to item 3 of the present disclosure, a positive voltage of said preset scanning signal is obtained based on a common voltage and a stipulated regulation voltage; and a negative voltage of said preset scanning signal is obtained based on a negative voltage of said data signal and said stipulated regulation voltage.

5. In one preferred embodiment of any one of item 1 to item 4 of the present disclosure, said stipulated regulation voltage ranges from −14V to 14V.

6. According to another aspect of the present disclosure, the present disclosure further provides a method for driving the above liquid crystal display panel, said method comprising: transmitting, during a positive/negative half period, by the first scanning line of each pixel unit, a scanning signal to turn on said first switch, and a data signal of the data line of each pixel unit to said pixel electrode, so that said pixel electrode has an electric potential; and transmitting, during said positive/negative half period, by the second scanning line which is adjacent to said first scanning line, the preset scanning signal to critically turn on said second switch, and reducing/raising, by said second switch, the electric potential of said pixel electrode gradually until the electric potential is equal to an electric potential of said common electrode.

7. In one preferred embodiment of item 6 of the present disclosure, said preset scanning signal includes a group of signals which change with the data signal of said data line.

8. In one preferred embodiment of item 6 or item 7 of the present disclosure, a positive voltage of said preset scanning signal is obtained based on a common voltage and a stipulated regulation voltage; and a negative voltage of said preset scanning signal is obtained based on a negative voltage of said data signal and said stipulated regulation voltage.

9. In one preferred embodiment of any one of item 6 to item 8 of the present disclosure, said stipulated regulation voltage ranges from −14V to 14V.

Compared with the prior art, one embodiment or a plurality of embodiments of the present disclosure may have the following advantages.

According to the embodiment of the present disclosure, the pixel units of the liquid crystal display panel are not designed through the charge sharing method. The liquid crystal display panel is driven by preset scanning signal, and one pixel electrode can present different voltages during different time of one frame without the aperture ratio thereof being reduced. That is to say, one pixel can present different degrees of brightness during different time of one frame, and thus the low color shift display effect can be realized. Since the penetration of the Cell of the liquid crystal display panel is not reduced, no additional circuit needs to be added to the backlight source, and thus the cost of the back-light would not increase.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings are used to provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be illustrated in detail hereinafter in combination with the accompanying drawings to make the purpose, technical solutions, and advantages of the present disclosure more clear.

Figure 1:
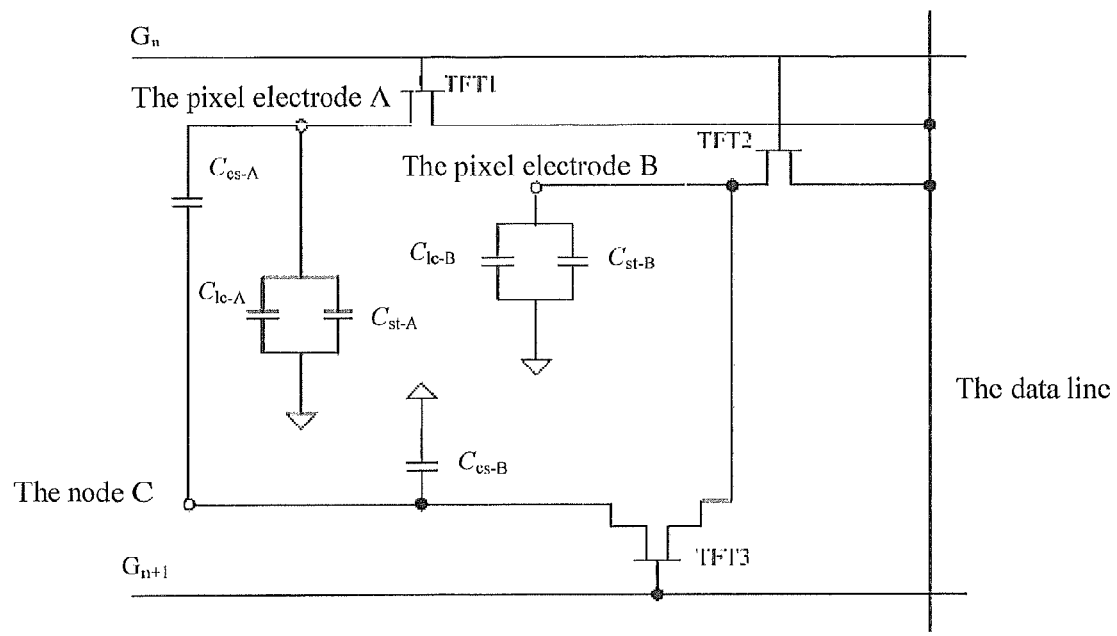
FIG. 1 schematically shows an equivalent circuit of a pixel unit with three Thin Film Transistors in the prior art.
Figure 2:
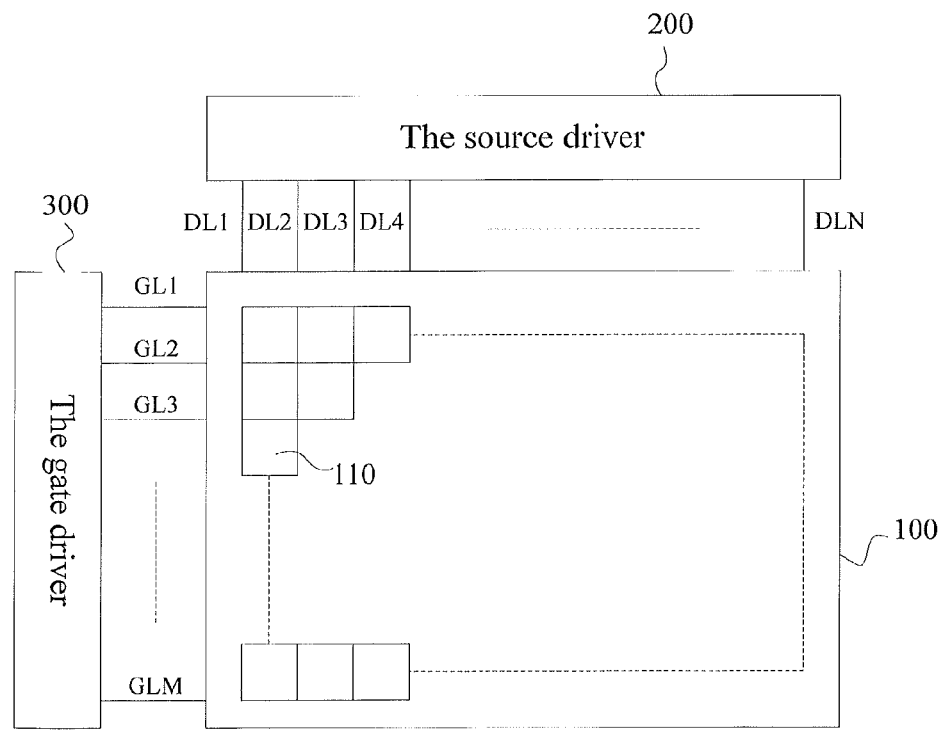
FIG. 2 is a structural diagram of a liquid crystal display panel according to one embodiment of the present disclosure.

FIG. 2 is a structural diagram of a liquid crystal display panel according to one embodiment of the present disclosure. The display panel comprises an image display area 100, a source driver 200, and a gate driver 300. The image display area 100 comprises an array that is configured by a plurality of data lines (which are also referred to as information lines, see the N data lines DL1-DLN as shown in FIG. 2) and a plurality of scanning lines (which are also referred to as gate lines, see the M scanning lines GL1-GLM as shown in FIG. 2) that are arranged in a staggered manner with respect to each other, and a plurality of pixel structures 110. The source driver 200 transmits data signal provided therein to the image display area 100 through the plurality of data lines coupled therewith; and the gate driver 300 transmits scanning signal provided therein to the image display area 100 through the plurality of scanning lines coupled therewith.

Figure 3:
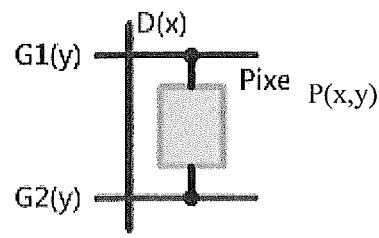
FIG. 3 roughly shows a structure of a pixel unit of the liquid crystal display panel according to one embodiment of the present disclosure.

It should be noted that, the term "pixel structure" referred to herein comprises a plurality of pixel units, and each pixel unit is configured in a corresponding pixel area of the pixel areas that are formed by the plurality of data lines and the plurality of scanning lines arranged in a staggered manner with respect to each other. As shown in FIG. 3, a pixel area is formed by a data line D(x) and two scanning lines G1(y) and G2(y), and a pixel unit is configured in said pixel area.

Figure 4:
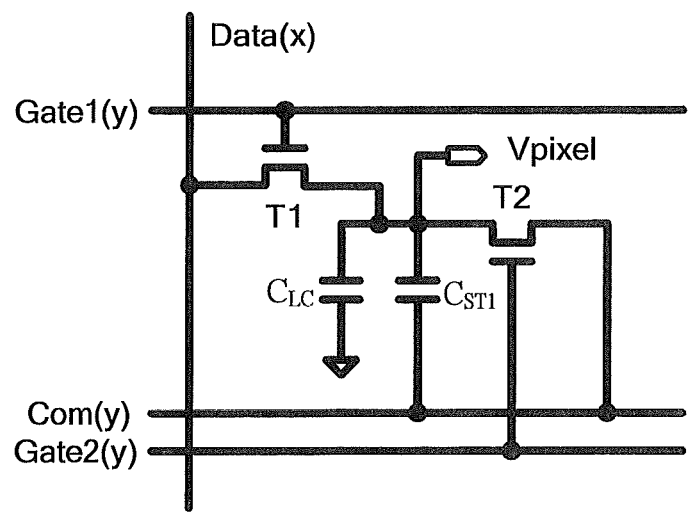
FIG. 4 schematically shows an equivalent circuit of a pixel unit of the liquid crystal display panel according to one embodiment of the present disclosure.

FIG. 4 schematically shows an equivalent circuit of a pixel unit according to one embodiment of the present disclosure. As shown in FIG. 4, the pixel unit comprises two switching elements T1 and T2, a storage capacitor $C_{ST1}$ and a liquid crystal capacitor $C_{LC}$. The switching elements T1 and T2 are both preferably made of Thin Film Transistors.

As shown in FIG. 4, the switching element T1 is connected between a data line Data(x) and a pixel electrode $V_{pixel}$, and a control end thereof (i.e., a gate) is connected to a scanning line Gate1(y). The storage capacitor $CS_{T1}$ is connected between the pixel electrode $V_{pixel}$ and a common electrode Com(y). The liquid crystal capacitor $C_{LC}$ is connected between the pixel electrode $V_{pixel}$ and another common electrode. The switching element T1 is turned on when it receives a turn-on signal from the scanning line Gate1(y), so that the data signal of the data line Data(x) is transmitted to the storage capacitor $C_{ST1}$ through the switching element T1, and the storage capacitor $C_{ST1}$ is charged according to the data signal and then stored with a corresponding electric potential. Based on this, the pixel electrode $V_{pixel}$ has the corresponding electric potential also, and thus the pixel unit displays image data accordingly.

However, the low color shift display effect cannot be realized through the above display method. In order to reduce the cost of the LCD panel without affecting the aperture ratio and the penetration thereof, the present embodiment provides an improvement of the pixel unit. As shown in FIG. 4, the pixel unit further comprises a switching element T2, which is connected between said common electrode Com(y) and said pixel electrode $V_{pixel}$, and a control end of which is connected to a scanning line Gate2 (y).

It should be especially noted that, compared with traditional pixel unit design, the signal transmitted by the scanning line Gate2(y) includes a group of preset scanning signals, and the magnitude thereof can be regulated. In the present embodiment, the preset scanning signal includes a group of square wave signals which change with the variation of the data signal (compared with a common voltage thereof).

Figure 5:
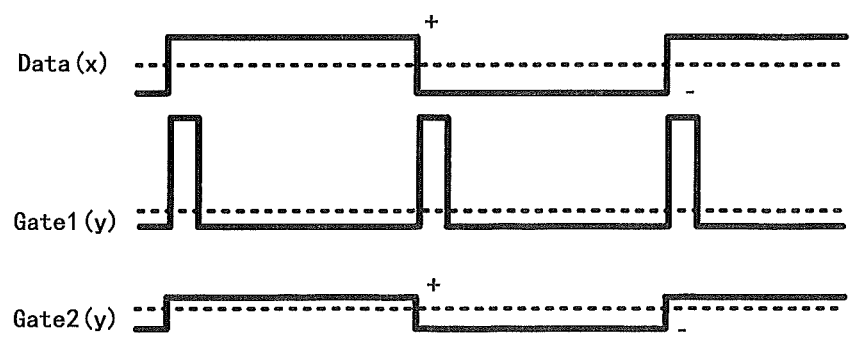
FIG. 5 schematically shows a time sequence graph of a method for driving the liquid crystal display panel according to one embodiment of the present disclosure.

As shown in FIG. 5, the duty ratio of the square wave signal transmitted by the scanning line Gate2(y) is the same as the duty ratio of the square wave signal transmitted by the data line Data(x). When the signal transmitted by the data line Data(x) is a positive voltage signal, the signal transmitted by the scanning line Gate2(y) is also a positive voltage signal. Similarly, when the signal transmitted by the data line Data(x) is a negative voltage signal, the signal transmitted by the scanning line Gate2(y) is also a negative voltage signal. The above arrangement enables the pixel electrode to perform gradual electric leakage with the T2 being turned on, so that one pixel unit can present different degrees of brightness during different time of one frame, and thus the low color shift display effect can be realized.

Preferably, the magnitude of the preset scanning signal is related to the data line Data(x). In the present embodiment, a positive voltage Vgate2+ of said preset scanning signal is obtained based on a common voltage Vcom and a stipulated regulation voltage X; and a negative voltage Vgate2− of said preset scanning signal is obtained based on a negative voltage Vdata− of said data signal and said stipulated regulation voltage X. That is to say, the positive voltage Vgate2+ and the negative voltage Vgate2− of the preset scanning signal can be obtained respectively through the following equations:

$$(Vgate2+)=Vcom+X$$

$$(Vgate2-)=(Vdata-)+X$$

Considering the brightness needed during actual display, the value of X preferably ranges from −14V to 14V. The brightness of the pixel can be regulated through adjustment of the value of X, and thus the display effect under wide viewing angles can be finally achieved. Of course, the above manner is just a preferred example, and the stipulated regulation voltage X can be selected by a person skilled in the art according to actual needs.

The switching element T2 is critically turned on when receives the preset scanning signal of the scanning line Gate2(y). The expression "critically turned on", which can be referred to as "slightly turned on" as well, means that the TFT does not work under its saturation voltage.

During the process of the switching element T2 being slightly turned on, the electric potential of the pixel electrode $V_{pixel}$ gradually reduces to the electric potential of the common electrode Com(y) (i.e., the common voltage) through electric leakage. In other words, the electric potential of the pixel electrode $V_{pixel}$ decreases gradually through the switching element T2, until it is equal to the electric potential of the common electrode Com(y). In this case, during the whole electric leakage process, the pixel electrode $V_{pixel}$ has different electric potentials at different time of one frame, and thus one pixel can present different degrees of brightness during different time of one frame, so that the low color shift display effect can be realized.

The specific driving time sequence during two dimensional (2D) display will be illustrated hereinafter with reference to FIG. 5. However, FIG. 5 is just an example, and is not used for limiting the present disclosure. That is, the variation of the electric potential of the pixel electrode $V_{pixel}$ can be adjusted according to actual needs without departing from the spirit and scope of the present disclosure.

During 2D display, briefly speaking, the electric potential of the pixel electrode $V_{pixel}$ can be reduced through the additional switching element T2 and the scanning signal of the scanning line Gate2(y) used for controlling T2. In this case, a certain electric potential difference ΔV of the pixel electrode $V_{pixel}$ can be formed during different time of one frame, so that a better low color shift display effect can be realized.

Specifically, reference can be made to FIG. 4 and FIG. 5. During a positive half period (i.e., a positive polarity reversion period of polarity reversion, wherein the electric potential of the data signal is higher than the electric potential of the common electrode), when the scanning line Gate1(y) transmits the scanning signal (i.e., outputs a high-level voltage), the switching element T1 is turned on according to the scanning signal. The data signal of the data line Data(x) is transmitted to the storage capacitor $CS_{T1}$ through the switching element T1, the storage capacitor $CS_{T1}$ is charged according to the data signal and then stored with the corresponding electric potential, and thus the pixel electrode $V_{pixel}$ has the corresponding electric potential.

Then, since the scanning line Gate2(y) transmits the preset scanning signal during this period, the switching element T2 is slightly turned on according to the scanning signal. The electric potential of the pixel electrode $V_{pixel}$ can be reduced gradually (i.e., electric leakage) through the switching element T2, until it is equal to the electric potential of the common electrode. In this case, during the positive half period, one pixel having different voltages in different time can be realized.

Similarly, during a negative half period (i.e., a negative polarity reversion period of polarity reversion, wherein the electric potential of the data signal is lower than the electric potential of the common electrode), when the scanning line Gate1(y) transmits the scanning signal, the switching element T1 is turned on according to the scanning signal. The data signal of the data line Data(x) is transmitted to the storage capacitor $C_{ST1}$ through the switching element T1, the storage capacitor $C_{ST1}$ is charged according to the data signal and then stored with the corresponding electric potential, and thus the pixel electrode $V_{pixel}$ has the corresponding electric potential.

Then, since the scanning line Gate2(y) transmits direct-current scanning signal during this period, the switching element T2 is slightly turned on according to the scanning signal. The electric potential of the pixel electrode $V_{pixel}$ can be raised gradually through the switching element T2, until it is equal to the electric potential of the common electrode. In this case, during the negative half period, one pixel having different voltages in different time can be realized.

In this manner, during both positive polarity reversion operation and negative polarity reversion operation, one pixel can have different electric potentials during different time of one frame, and can present different degrees of brightness during different time of one frame. Therefore, the color shift problem of the display panel during 2D display can be solved effectively, and thus the low color shift display effect can be realized.

In addition, compared with the prior art, no additional Thin Film Transistors or capacitors is added to the pixel unit according to the present embodiment. Therefore, the aperture ratio and the penetration of the Cell are not affected, and the cost of the backlight source is not increased.

Figure 6:
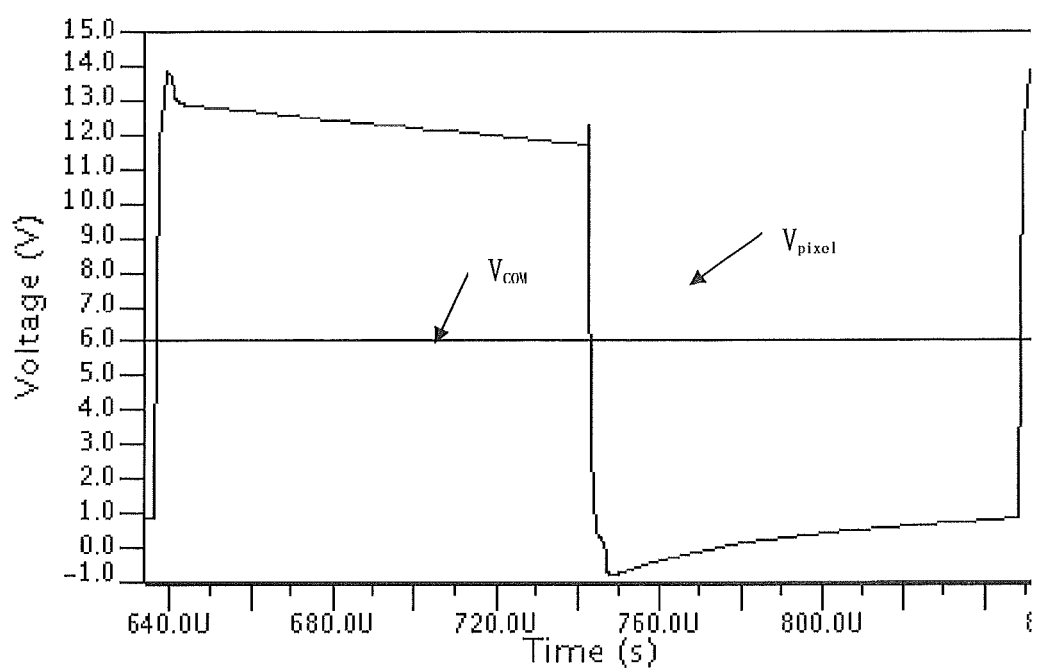
FIG. 6 schematically shows a simulation result of the method according to the embodiment of the present disclosure.

Further, the result of the embodiment of the present disclosure is examined by the applicant through experiments. As shown in FIG. 6, the electric potential of the pixel electrode $V_{pixel}$ changes gradually, and one pixel can present different voltages during different time of one frame.

The preferred embodiments of the present disclosure are stated hereinabove, but the protection scope of the present disclosure is not limited by this. Any changes or substitutes readily conceivable for any one skilled in the art within the technical scope disclosed by the present disclosure shall be covered by the protection scope of the present disclosure. Therefore, the protection scope of the present disclosure shall be determined by the scope as defined in the claims.

The invention claimed is:

1. A liquid crystal display panel, comprising a plurality of pixel units, each pixel unit comprising:
    a data line;
    a first scanning line;
    a second scanning line, adjacent to said first scanning line, and configured to transmit a preset scanning signal;
    a first switch, connected between said data line and a pixel electrode, and configured to be turned on when receives a scanning signal of said first scanning line;
    a second switch, connected between said pixel electrode and a common electrode, and configured to be critically turned on when receives the preset scanning signal of said second scanning line;
    a storage capacitor, connected between said pixel electrode and said common electrode; and
    a liquid crystal capacitor, one end of which is connected to said pixel electrode,
    wherein when the first switch is turned on, said pixel electrode receives a data signal from said data line to have an electric potential, and when the second switch is critically turned on, the electric potential of said pixel electrode decreases gradually through said second switch until the electric potential is equal to an electric potential of said common electrode.

2. The liquid crystal display panel according to claim 1, wherein
    said first switch and said second switch each comprise a gate, a first source/drain, and a second source/drain;
    the gate of said first switch is connected to said first scanning line, and the first source/drain and the second source/drain of said first switch are connected to said data line and said pixel electrode respectively; and
    the gate of said second switch is connected to said second scanning line, and the first source/drain and the second source/drain of said second switch are connected to said pixel electrode and said common electrode respectively.

3. The liquid crystal display panel according to claim 1, wherein said preset scanning signal includes a group of signals which change with the data signal of said data line.

4. The liquid crystal display panel according to claim 3,
    wherein a positive voltage of said preset scanning signal is obtained based on a common voltage and a stipulated regulation voltage; and
    wherein a negative voltage of said preset scanning signal is obtained based on a negative voltage of said data signal and said stipulated regulation voltage.

5. The liquid crystal display panel according to claim 4, wherein said stipulated regulation voltage ranges from −14V to 14V.

6. A method for driving a liquid crystal display panel, said liquid crystal display panel comprising a plurality of pixel units, each pixel unit comprising: a data line; a first scanning line; a second scanning line, adjacent to said first scanning line, configured to transmit a preset scanning signal; a first switch, connected between said data line and a pixel electrode, and configured to be turned on when receives a scanning signal of said first scanning line; a second switch, connected between said pixel electrode and a common electrode, and configured to be critically turned on when receives the preset scanning signal of said second scanning line; a storage capacitor, connected between said pixel electrode and said common electrode; and a liquid crystal capacitor, one end of which is connected to said pixel electrode, said method comprising:
    transmitting, during a positive/negative half period, by the first scanning line of each pixel unit, a scanning signal to turn on said first switch, and a data signal of the data line of each pixel unit to said pixel electrode, so that said pixel electrode has an electric potential; and
    transmitting, during said positive/negative half period, by the second scanning line which is adjacent to said first scanning line, the preset scanning signal to critically turn on said second switch, and reducing/raising, by said second switch, the electric potential of said pixel electrode gradually until the electric potential is equal to an electric potential of said common electrode.

7. The method according to claim 6, wherein said preset scanning signal includes a group of signals which change with the data signal of said data line.

8. The method according to claim 7,
    wherein a positive voltage of said preset scanning signal is obtained based on a common voltage and a stipulated regulation voltage; and
    wherein a negative voltage of said preset scanning signal is obtained based on a negative voltage of said data signal and said stipulated regulation voltage.

9. The method according to claim 8, wherein said stipulated regulation voltage ranges from −14V to 14V.

* * * * *